3,372,138
PROCESS FOR COLORING SYNTHETIC
LINEAR POLYESTERS
Francis Bowman, Albert Charles Cooper, and Francis Irving, Manchester, England, assignors to Imperial Chemical Industries Limited, London, England
No Drawing. Filed May 28, 1965, Ser. No. 459,914
Claims priority, application Great Britain, June 8, 1964, 23,599/64; Oct. 16, 1964, 42,323/64
7 Claims. (Cl. 260—40)

This invention relates to a coloration process and more particularly to a process for the mass coloration of synthetic linear polyesters, particularly polyethylene terephthalate.

In order for a colouring matter to be completely satisfactory for use in the mass coloration of synthetic linear polyesters it must fulfil the following requirements:

(1) It must be capable of withstanding the high temperature of the molten material (290° C.).

(2) It must not have a high volatility, otherwise it may sublime during the spinning process, causing irregular coloration, and fabrics subsequently subjected to pleating operations may lose colour strength or cause marking of adjacent fabric.

(3) It must have high fastness to light, and to the action of dry-cleaning solvents, perspiration and bleaches.

It has now been found that a class of polycyclic dyestuff compounds is particularly valuable for the mass coloration of synthetic linear polyesters.

According to the invention there is provided a process for the mass coloration of synthetic linear polyesters which comprises using as colouring matter one or more dyestuffs of the formula:

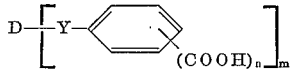

wherein:
D represents a polycyclic dyestuff radical which contains at least three condensed ring systems and which is free from sulphonic acid groups;
Y represents —NH— or —S—;
$n$ represents a positive integer not exceeding 3,
$m$ represents a positive integer not exceeding 4; and the benzene ring A may be further substituted by chlorine or bromine atoms.

It is preferred that $n$ represents 1; and that the —COOH group is attached to the benzene ring A in ortho position to the bridging atom or group represented by Y.

The polycyclic dyestuff radical represented by D may be the radical of any polycyclic ring system which is normally present in polycyclic dyestuffs and which contains at least three condensed ring systems, and preferably from three to eight condensed ring systems, which can be carbocyclic or heterocyclic rings or a combination of both types. If desired the said polycyclic dyestuff radical can contain further substituents, other than sulphonic acid groups, which are commonly present in such dyestuff radicals, for example chlorine or bromine atoms, carboxylic acid groups, lower alkyl radicals such as the methyl radical, lower alkoxy radicals such as the methoxy radical, hydroxy groups, amino groups, N-lower alkylamino groups such as methylamino, ethylamino, dimethylamino and diethylamino groups, and acylamino groups such as acylamino groups derived from lower aliphatic carboxylic acids such as acetylamino and propionylamino groups, or from monocyclic aryl carboxylic acids such as the benzoylamino group. It is however preferred that D represents a 1': 9'-anthrapyridone, 1':9'-anthrapyrimidine, isothiazoloanthrone, pyrazoleanthrone, 3':4'-phthaloylacridone, phthaloylperinone, and, above all, an anthraquinone dyestuff radical.

The dyestuff radical D is attached to the atom or group represented by Y through the carbon atom of an aryl ring, which is preferably a benzene ring, present in D.

Throughout the specification the terms "lower alkyl" and "lower alkoxy" are used to denote alkyl and alkoxy radicals respectively containing from 1 to 4 carbon atoms.

The dyestuffs used in the process of the invention may themselves be obtained by reacting a dyestuff compound of the formula D—(Cl)$_m$ with a compound of the formula

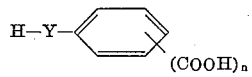

As specific examples of dyestuffs which can be used in the process of the invention there may be mentioned 1:5-bis-(o-carboxyanilino)anthraquinone
1:8-bis-(o-carboxyanilino)anthraquinone
1:4-bis-(o-carboxyanilino)anthraquinone
1:5-bis-(m-carboxyanilino)anthraquinone
1:5-bis-(p-carboxyanilino)anthraquinone
1:5-bis-(o-methoxycarbonylanilino)anthraquinone
1:5-bis-(o-octyloxycarbonylanilino)anthraquinone
1:5-bis-(o-β-ethoxyethoxycarbonylanilino)anthraquinone
1:5-bis-(o-aminocarbonylanilino)anthraquinone
1:5-bis-(o-methylaminocarbonylanilino)anthraquinone
1:5-bis-(o-phenylaminocarbonylanilino)anthraquinone
1:8-bis-(p-carboxyanilino)anthraquinone
1:8-bis-(m-carboxyanilino)anthraquinone
1:4-bis-(p-carboxyanilino)anthraquinone
1:4-bis-(m-carboxyanilino)anthraquinone
1:5-bis-(2':5'-dicarboxyanilino)anthraquinone
1:5-bis-(3':5'-dicarboxyanilino)anthraquinone
1:5-bis-(o-dodecyloxycarbonylanilino)anthraquinone
1:5-bis-(o-cyclohexyloxycarbonylanilino)anthraquinone
3:7-dibromo-1:5-bis-(o-carboxyanilino)anthraquinone The process of the invention can be conveniently carried out by incorporating one or more of the said dyestuffs into the synthetic linear polyesters by any of the known techniques for mass coloration of such materials. Thus the dyestuff in finely divided form may be coated onto chips of the polyester by tumbling and the resulting coloured mixture subsequently melted and spun into filaments or shaped into solid objects. If desired, tumbling may be carried out with a dispersion of the dyestuff in a volatile liquid e.g. water or alcohol, or such a liquid may be used to moisten the mixture of dyestuff and polymer during the stage of tumbling. The volatile liquid is preferably removed by evaporation before melting. The dyestuff may also be incorporated with monomers or prepolymers at any convenient stage in the preparation of the polyester.

If desired the dyestuffs can be used in the form of salts, such as the ammonium salts, which give rise to the free acids during the heat treatment required to melt the polyester.

As examples of synthetic linear polyesters which can be coloured by the process of the invention there may be mentioned polyesters which are obtained by the reaction of terephthalic acid with glycols of the formula HO—(CH$_2$)$_x$—OH wherein $x$ is an integer of from 2 to 10, or with 1:4-di(hydroxymethyl)cyclohexane. The term synthetic linear polyesters also includes copolyesters based on the said polyesters; such copolyesters being obtained by replacing a portion of the terephthalic acid by another dicarboxylic acid or by a hydroxycarboxylic acid, and/or replacing a portion of the glycol by a different glycol.

The colorations produced by the process of the invention have good fastness to washing, pressure steaming, acid cross dyeing, perspiration, rubbing after steaming, dry heat treatments such as are used in pleating operations, and to light. It is also found that the colourations can be produced in heavy depths of shade, without impairing the properties of the synthetic linear polyesters or fibres derived therefrom.

A class of the dyestuffs which is especially valuable for use in the process of the invention comprises the dyestuffs of the formula:

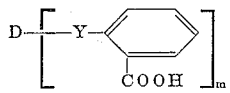

wherein D, Y, and $m$ have the meanings stated. Preferably Y represents the —NH— group.

A second class of the dyestuffs which is especially valuable in the process of the invention comprises the dyestuffs of the formula:

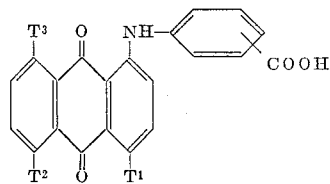

wherein $T^1$, $T^2$ and $T^3$ each independently represents hydrogen atoms or a group of the formula:

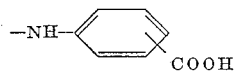

In this class the —COOH group is preferably attached to the benzene ring in ortho position to the —NH— group.

Such dyestuffs when used in the process of the invention yield red, violet or green shades of excellent fastness properties.

The invention is illustrated but not limited by the following examples in which the parts are by weight.

Example 1

1 part of 1:5-bis-(o-carboxyanilino)anthraquinone in powder form is tumbled with 100 parts of polyethylene terephthalate in the form of chips. The resulting mixture is then melt spun in known manner to produce fibres of a deep red colour and excellent fastness properties.

Example 2

1 part of 3:7-dibromo-1:5-bis-(o-carboxyanilino)-anthraquinone is tumbled with 100 parts of polyethylene terephthalate in the form of chips and the resulting mixture is melt spun to form fibres of a deep crimson colour and excellent fastness properties.

Similar crimson fibres may be obtained by spinning polyethylene terephthalate obtained from ethylene glycol and terephthalic acid by polymerisation in presence of the said anthraquinone dyestuff.

The 3:7 - dibromo - 1:5 - bis-(o-carboxyanilino)anthraquinone was obtained by reacting 1:3:5:7-tetrabromo-anthraquinone (obtained by brominating 1:5- or 2:6-diaminoanthraquinone to introduce four bromine atoms and then eliminating the amino groups, for example, as described in Liebig's Annalen der Chemie, volume 585, page 178) with two molecular proportions of anthranilic acid in the presence of potassium acetate, a copper catalyst and a solvent such as pentanol. The dyestuff was obtained as a red-violet powder soluble in concentrated sulphuric acid to a yellow-olive solution which becomes red-brown on warming due to cyclisation to the diacridone.

Example 3

1 part of 1-(o-carboxyanilino)anthraquinone in powder form and 3 parts of β-ethoxyethanol are tumbled with 100 parts of polyethylene terephthalate in the form of small granules until a uniform mixture results. The coloured mixture is dried at 120° C. in a vacuum, and is then melt spun to give fibres of a strong scarlet shade and good fastness properties.

Example 4

1 part of 3-chloro-1-(o-carboxyanilino)anthraquinone, in finely divided form, 3 parts of water and 100 parts of polyethylene terephthalate in the form of granules are mixed together until a uniform mixture is obtained. The mixture is then dried at 100° C., and melt-spun to yield uniformly coloured fibres of a bright scarlet shade which possess excellent fastness properties.

A similar result is obtained when 3-bromo-1-(o-carboxyanilino)anthraquinone is used in place of the 3-chloro-1-(o-carboxyanilino)anthraquinone.

The following table gives further examples illustrating the process of the invention which may be carried out by methods similar to those described in Examples 1 to 4 above, but using the dyestuffs listed in the second column of the table. The third column of the table indicates the shades of the resulting polyester fibres.

| Example | Dyestuff | Shade |
|---|---|---|
| 5 | 1:4:5:8-tetra-(o-carboxyanilino)anthraquinone. | Green. |
| 6 | 1-methylamino-4-(o-carboxyanilino)-anthraquinone. | Blue. |
| 7 | 6-(o-carboxyanilino)-3-methyl-1′:9′-anthrapyridone. | Carmine. |
| 8 | 1:5-bis(o-carboxyphenylthio)anthraquinone. | Yellow. |
| 9 | 1:5-bis(4′:6′-dichloro-2′-carboxyphenylthio)anthraquinone. | Greenish-yellow. |
| 10 | 1:8-bis-(o-carboxyphenylthio)anthraquinone. | Yellow. |
| 11 | 1:4-bis(o-carboxyphenylthio)anthraquinone. | Yellowish-red. |
| 12 | 1:3-bis(o-carboxyphenylthio)anthraquinone. | Greenish-yellow. |
| 13 | 1:8-bis(p-carboxyphenylthio)anthraquinone. | Yellow. |
| 14 | 1:5-bis(p-carboxyphenylthio)anthraquinone. | Do. |
| 15 | 1:8-bis-(m-carboxyphenylthio)anthraquinone. | Do. |
| 16 | 1:5-bis(m-carboxyphenylthio)anthraquinone. | Do. |
| 17 | 1-(o-carboxyphenylthio)anthraquinone. | Do. |
| 18 | 1-(o-carboxyphenylthio)-5-benzoyl amino-anthraquinone. | Do. |
| 19 | 1-(o-carboxyphenylthio)-8-benzoyl-amino-anthraquinone. | Do. |
| 20 | ___do___ | Orange. |
| 21 | 1:4:5-tri(o-carboxyanilino)anthraquinone. | Greenish-black. |
| 22 | 2-bromo-1-amino-4-(o-carboxyanilino)-anthraquinone. | Royal blue. |
| 23 | 2-bromo-1-hydroxy-4-(o-carboxyanilino)-anthraquinone. | Violet. |
| 24 | 1-amino-4-(o-carboxyanilino)anthraquinone. | Deep violet. |
| 25 | 1-amino-5-(o-carboxyanilino)anthraquinone. | Red. |
| 26 | 1-methylamino-4-(o-carboxyanilino)-anthraquinone. | Deep blue. |
| 27 | 1-methylamino-5-(o-carboxyanilino)-anthraquinone. | Crimson. |
| 28 | 1-benzoylamino-5-(o-carboxyanilino)-anthraquinone. | Blue-violet. |
| 29 | 2-chloro-1-amino-4-(o-carboxyanilino)-anthraquinone. | Blue. |
| 30 | 2-bromo-1-amino-4-(o-carboxyanilino)-anthraquinone. | Royal blue. |
| 31 | 2-acetyl-1-amino-4-(o-carboxyanilino)-anthraquinone. | Blue-green. |
| 32 | 2-methyl-1-amino-4-(o-carboxyanilino)-anthraquinone. | Reddish-blue. |
| 33 | 2-cyano-1-amino-4-(o-carboxyanilino)-anthraquinone. | Blue-green. |
| 34 | 1-amino-4-(o-carboxyanilino)-2-methoxy-anthraquinone. | Reddish-blue. |
| 35 | 2-bromo-4-(o-carboxyanilino)-1-hydroxy-anthraquinone. | Violet. |
| 36 | 1:4-bis-(o-carboxyanilino)anthraquinone. | Blue-green. |
| 37 | 1:4-bis-(m-carboxyanilino)anthraquinone. | Greenish-blue. |
| 38 | 1:4-bis-(p-carboxyanilino)anthraquinone. | Green. |
| 39 | 1:5-bis-(m-carboxyanilino)anthraquinone. | Crimson. |
| 40 | 1:5-bis-(p-carboxyanilino)anthraquinone. | Ruby red. |
| 41 | 1:5-bis-(2:5-dicarboxyanilino)anthraquinone. | Pink. |
| 42 | 1:5-bis-(3:5-dicarboxyanilino)anthraquinone. | Orange-red. |
| 43 | 1:5-bis-(o-carboxyanilino)-4:8-dihydroxy-anthraquinone. | Deep blue. |
| 44 | 1:8-bis-(o-carboxyanilino)anthraquinone. | Bluish-red. |

| Example | Dyestuff | Shade |
| --- | --- | --- |
| 45 | 1:8-bis-(m-carboxanilino)anthraquinone. | Purple. |
| 46 | 1-benzoylamino-4:5-bis-(o-carboxyanilino)-anthraquinone. | Blue. |
| 47 | 1:4:5-tri-(o-carboxyanilino)anthraquinone. | Green. |
| 48 | 1:4:5:8-tetra(o-carboxyanilino)anthraquinone. | Deep green. |
| 49 | 5-(o-carboxyanilino)-1':9'-isothiazoloanthrone. | Orange-yellow. |
| 50 | 1-(o-carboxyanilino)-3-methyl-1':9'-anthrapyridone. | Yellow. |
| 51 | 6-(o-carboxyanilino)-3-methyl-1':9'-anthrapyridone. | Carmine. |
| 52 | 8-(o-carboxyanilino)-3-methyl-1':9'-anthrapyridone. | Red. |
| 53 | 4-(0-carboxyanilino)-2-phenyl-1':9'-anthrapyrimidine. | Pink. |
| 54 | 6-(o-carboxyanilino)-1':9'-anthrapyrimidone. | Red violet. |
| 55 | 6-(o-carboxyanilino)-2-phenyl-1:9'(N)-anthrapyrazolone. | Yellow. |
| 56 | 4-(o-carboxyanilino)-3':4'-phthaloyl-acridone. | Purple. |
| 57 | 7-(o-carboxyanilino)-3':4'-phthaloyl-acridone. | Crimson. |
| 58 | 1-(o-carboxyphenylthio)-anthraquinone. | Greenish-yellow. |
| 59 | 3-chloro-1-(o-carboxyphenylthio)-anthraquinone. | Do. |
| 60 | 1-amino-4-(o-carboxyphenylthio)-anthraquinone. | Crimson. |
| 61 | 1-benzoylamino-4-(o-carboxyphenylthio)-anthraquinone. | Scarlet. |
| 62 | 1-benzoylamino-5-(o-carboxyphenylthio)-anthraquinone. | Yellow. |
| 63 | 1-benzoylamino-8-(o-carboxylphenylthio)-anthraquinone. | Orange. |
| 64 | 1:3-bis-(o-carboxyphenylthio)anthraquinone. | Greenish-yellow. |
| 65 | 1:3-bis-(2:4-dichloro-6-carboxyphenylthio)anthraquinone. | Do. |
| 66 | 1:4-bis-(o-carboxyphenylthio)anthraquinone. | Yellowish-red. |
| 67 | 1:5-bis-(o-carboxyphenylthio)anthraquinone. | Yellow. |
| 68 | 1:5-bis-(m-carboxyphenylthio)anthraquinone. | Do. |
| 69 | 1:5-bis-(p-carboxyphenylthio)anthraquinone. | Do. |
| 70 | 1:5-bis-(2:4-dichloro-6-carboxyphenylthio)anthraquinone. | Greenish-yellow. |
| 71 | 1:8-bis-(o-carboxyphenylthio)anthraquinone. | Yellow. |
| 72 | 1:8-bis-(m-carboxyphenylthio)anthraquinone. | Do. |
| 73 | 1:8-bis-(p-carboxyphenylthio)anthraquinone. | Do. |
| 74 | 1-benzoylamino-4:5-bis-(o-carboxyphenylthio)anthraquinone. | Crimson. |
| 75 | 1-amino-4-(o-carboxyanilino)anthraquinone-2-carboxylic acid. | Turquoise blue. |
| 76 | 1-benzoylamino-4-(o-carboxyanilino)-anthraquinone. | Purple. |
| 77 | 1:8-bis-(o-carboxyanilino)-4:5-dihydroxy-anthraquinone. | Blue. |

The 1:5-bis-(4':6'-dichloro-2'-carboxyphenylthio)anthraquinone used in the above examples was obtained as described in Example 1 of British specification No. 956,014.

The 3-chloro-1-(o-carboxyanilino)anthraquinone used in the above examples was obtained by reacting 3-chloro-1-bromoanthraquinone with anthranilic acid in a solvent such as amyl alcohol and in the presence of potassium acetate and a copper catalyst.

The 3-bromo-1-(o-carboxyanilino)anthraquinone was obtained as described in volume 49 of Chemische Berichte at page 2159.

The 1:4:5:8-tetra(o-carboxyanilino)anthraquinone used in the above examples was obtained by heating a mixture of potassium anthranilate, 1:4:5:8-tetrachloroanthraquinone, potassium acetate, potassium iodide, cupric acetate and benzyl alcohol for 9 hours at 170° C., distilling off most of the benzyl alcohol, adding chlorobenzene and filtering off the solid. The solid was then purified by dissolving it in a dilute aqueous solution of ammonium hydroxide, subsequently acidifying the solution, and filtering off the precipitated solid.

The 1:4:5-tri(o-carboxyanilino)anthraquinone used in the above examples was obtained by the method described above for 1:4:5:8-tetra(o-carboxyanilino)anthraquinone starting from 1:4:5-trichloroanthraquinone.

The 1-methylamino-4-(o-carboxyanilino)anthraquinone used in the above examples was obtained by reacting 1-methylamino-4-bromoanthraquinone with anthranilic acid in pentanol in the presence of potassium acetate and a copper catalyst.

The 6-(o-carboxyanilino)-3-methyl-1':9'-anthrapyridone used in the above examples was obtained by reacting 6-bromo-3-methyl-1':9'-anthrapyridone with anthranilic acid in β-methoxyethanol in the presence of potassium acetate, cupric acetate and copper bronze.

The 1:8-bis-(o-carboxyanilino)-anthraquinone used in the above examples was prepared by reacting 1:8-dichloroanthraquinone with potassium anthranilate in presence of a copper catalyst using a solvent such as benzyl alcohol, or ethylene glycol at a temperature of 150° to 180° C.

The 1:4-bis-(o-carboxyanilino)-anthraquinone used in the above examples was prepared by reacting 1:4-diaminoanthraquinone with methyl o-bromobenzoate in nitrobenzene in presence of an acid-binding agent and a copper catalyst and hydrolysing the resultant ester with an alcoholic solution of potassium hydroxide.

The 1:5-bis-(m-carboxyanilino)-anthraquinone, 1:8-(bis-m-carboxyanilino)-anthraquinone and 1:5-bis-(p-carboxyanilino)-anthraquinone were prepared by reacting the appropriate dihalogeno-anthraquinone with the necessary aminobenzoic acid using the usual methods.

The 1:4-bis-(p-carboxyanilino)-anthraquinone was obtained by reacting leuco quinizarin with p-aminobenzoic acid in butanol in presence of butyl borate, the resulting product being finally oxidised by nitrobenzene in presence of piperidine. 1:4-bis-(m-carboxyanilino)-anthraquinone was prepared in the same way starting from m-aminobenzoic acid.

The 1-amino-4-(o-carboxyanilino)-2-methoxy- and 2-cyanoanthraquinone used in the above examples were obtained by reacting 2-bromo-1-amino-4-(o-carboxyanilino)anthraquinone with methanolic caustic potash and cuprous cyanide respectively.

The 6-(o-carboxyanilino)-1':9'-anthrapyrimidone was prepared by reacting 1-amino-4-(o-carboxyanilino)-anthraquinone with urea in phenol in presence of hydrogen chloride.

The 5-(o-carboxyanilino)-1':9'-isothiazoloanthrone was obtained by reacting 5-amino-1':9'-isothiazoloanthrone with methyl o-chlorobenzoate and hydrolysing the resulting ester with alcoholic alkali.

The other o-carboxyanilino-derivatives used in the above examples were all obtained by reacting the corresponding halogen derivative of the dyestuff with anthranilic acid in presence of a suitable solvent acid-binding agent and copper catalyst.

All the carboxyphenylthio-anthraquinones used in the above examples were prepared by reacting the corresponding halogeno-dyestuff derivative with the appropriate mercaptobenzoic acid in presence of potassium carbonate in water or a hydroxylic solvent such as ethanol.

*Example 78*

1 part of 1:8-bis(o-carboxyanilino)anthraquinone is tumbled with 100 parts of the polyester, in the form of chips, which is obtained from α:β-bis(4-carboxyphenoxy)ethane and ethylene glycol, and the resulting mixture is then melt spun to give fibres of a deep bluish-red shade possessing excellent fastness properties.

*Example 79*

100 parts of dimethyl terephthalate, 71 parts of ethylene glycol, 0.05 part of manganese acetate and 0.04 part of phosphorous acid are stirred together for 4 hours at 197° C., during which time about 33 parts of methanol distil off from the mixture. To this mixture is then added 3 parts of 1:8-bis(o-carboxyanilino)anthraquinone which has previously been wetted out by ball milling for 30 minutes in the presence of 12 parts of ethylene glycol. The temperature of the mixture is then increased to 277° C. and the pressure is reduced to 0.3 mm. of mercury and the heating is continued under these conditions for a further 6 hours, whilst the excess ethylene glycol distils off. The melt is then formed into filaments which are subsequently drawn out into fibres. The fibres so obtained are coloured a deep bluish red shade possessing excellent fastness properties.

*Example 80*

100 parts of dimethyl terephthalate, 71 parts of ethylene glycol, 0.05 part of manganese acetate, 0.04 part of phosphorous acid and 3 parts of 1:5-bis(o-carboxyanilino)anthraquinone are stirred for 4 hours at 197° C., during which time about 33 parts of methanol are distilled off. The temperature of the mixture is then increased to 277° C., the pressure is reduced, to 0.3 mm. of mercury and heating is continued under these conditions for a further 6 hours whilst the excess ethylene glycol is distilled off. The mixture is then formed into filaments which are subsequently drawn out into fibres. The resulting fibres are coloured a deep red shade possessing excellent fastness properties.

What we claim is:
1. Process for the mass coloration of synthetic linear polyesters which comprises using as colouring matter at least one dyestuff of the formula:

$$D\text{---}\left[Y\text{---}\underset{(COOH)_n}{\underline{\phantom{A}}\!\!A\!\!\phantom{A}}\right]_m$$

wherein:
D is a dyestuff radical which is free from sulphonic acid groups and which is selected from the class consisting of anthraquinone, anthrapyridone, isothiazoloanthrone, anthrapyrimidine, anthrapyrimidone and phthaloylacridone dyestuff radicals;
Y, which is attached to a carbon atom of a benzene ring present in D, is selected from the class consisting of —S— and —NH—;
$n$ is a positive integer not exceeding 2;
$m$ is a positive integer not exceeding 4; and any further substituents on the benzene ring A are chlorine atoms, by mixing said dyestuff with the polyester, melting the resulting mixture, and spinning said mixture into fibers.

2. Process as claimed in claim 1 wherein the dyestuff is a dyestuff of the formula:

$$D^1\text{---}\left[NH\text{---}\underset{(COOH)_n}{\underline{\phantom{A}}\!\!\phantom{A}\!\!\phantom{A}}\right]_m$$

wherein:
$D^1$ is an anthraquinone dyestuff radical;
$n$ is a positive integer not exceeding 2; and
$m$ is a positive integer not exceeding 4.

3. Process as claimed in claim 1 wherein the dyestuff is a dyestuff of the formula:

$$D^1\text{---}\left[S\text{---}\underset{(COOH)_n}{\underline{\phantom{A}}\!\!\phantom{A}\!\!\phantom{A}}\right]_m$$

wherein:
$D^1$ is an anthraquinone dyestuff radical;
$n$ is a positive integer not exceeding 2; and
$m$ is a positive integer not exceeding 4.

4. Process as claimed in claim 2 wherein the —COOH group is in the ortho position to the —NH— group, $n$ is 1 and $m$ is 2.

5. Process as claimed in claim 1 wherein the dyestuff is a dyestuff of the formula:

[anthraquinone structure with $T^1$, $T^2$, $T^3$ substituents and NH-phenyl-COOH group]

wherein $T^1$, $T^2$ and $T^3$ are hydrogen or $$\text{---}NH\text{---}\underset{COOH}{\underline{\phantom{A}}\!\!\phantom{A}\!\!\phantom{A}}$$

6. Process as claimed in claim 5 wherein $T^1$ and $T^3$ are hydrogen and $T^2$ is $$\text{---}NH\text{---}\underset{COOH}{\underline{\phantom{A}}\!\!\phantom{A}\!\!\phantom{A}}$$

7. Process for the mass coloration of synthetic linear polyesters which comprises using as colouring matter at least one dyestuff of the formula:

$$D\text{---}\left[Y\text{---}\underset{(COOH)_n}{\underline{\phantom{A}}\!\!A\!\!\phantom{A}}\right]_m$$

wherein:
D is a dyestuff radical which is free from sulphonic acid groups and which is selected from the class consisting of anthraquinone, anthrapyridone, isothiazoloanthrone, anthrapyrimidine, anthrapyrimidone and phthaloylacridone dyestuff radicals.
Y, which is attached to a carbon atom of a benzene ring present in D, is selected from the class consisting of —S— and —NH—;
$n$ is a positive integer not exceeding 2;
$m$ is a positive integer not exceeding 4; and any further substituents on the benzene ring A are chlorine atoms, by mixing said dyestuff with the polyester forming components which are then polymerized to form the polyester.

References Cited

UNITED STATES PATENTS

| | | | |
|---|---|---|---|
| 1,841,674 | 1/1932 | Rintelman et al. | 260—376 |
| 2,091,145 | 8/1937 | Haddock et al. | 260—376 |
| 2,107,000 | 2/1938 | Hilpert | 260—376 |
| 2,888,467 | 5/1959 | Richter | 260—40 |
| 3,228,780 | 1/1966 | Grelat | 260—40 |

MORRIS LIEBMAN, *Primary Examiner.*

L. T. JACOBS, *Assistant Examiner.*